United States Patent
Matsuda et al.

(10) Patent No.: US 11,167,501 B2
(45) Date of Patent: Nov. 9, 2021

(54) RESIN FRAME AND FITTING

(71) Applicants: YKK Corporation, Tokyo (JP); YKK AP INC., Tokyo (JP)

(72) Inventors: Koji Matsuda, Kurobe (JP); Kazuhiro Kanayama, Kurobe (JP); Isao Kobayashi, Tokyo (JP)

(73) Assignee: YKK AP INC., Tokyo (JP)

( * ) Notice: Subject to any disclaimer, the term of this patent is extended or adjusted under 35 U.S.C. 154(b) by 244 days.

(21) Appl. No.: 16/433,168

(22) Filed: Jun. 6, 2019

(65) Prior Publication Data

US 2020/0009804 A1    Jan. 9, 2020

(30) Foreign Application Priority Data

Jun. 8, 2018   (JP) .............................. JP2018-109973

(51) Int. Cl.
  *E06B 3/22*    (2006.01)
  *B29C 65/00*   (2006.01)
  *B29C 65/20*   (2006.01)

(52) U.S. Cl.
  CPC ........ *B29C 66/52431* (2013.01); *B29C 65/20* (2013.01); *B29C 66/71* (2013.01); *B29C 66/72523* (2013.01); *E06B 3/22* (2013.01); *B29C 2793/009* (2013.01)

(58) Field of Classification Search
  CPC .... E06B 3/22; E06B 3/9608; E06B 2003/262; E06B 3/26; B29L 2031/005; B29C 66/73921; B29C 66/322; B29C 66/52431; B29C 65/20; B29C 66/71; F16B 12/46
  See application file for complete search history.

(56) References Cited

FOREIGN PATENT DOCUMENTS

JP    2540218 B2    10/1996
JP    4926016 B2    5/2012

*Primary Examiner* — Yan Lan
(74) *Attorney, Agent, or Firm* — Kilpatrick Townsend & Stockton LLP

(57) ABSTRACT

A resin frame includes frame members combined into a frame shape that includes a corner portion, and a joint portion joining a pair of the frame members which are adjacent to each other at the corner portion. The joint portion includes an entire-surface welded portion, in which end surfaces of the pair of the frame members are welded to each other over an entire surface in a thickness direction of a plate portion of the frame members, and a partial welded portion, in which the end surfaces of the pair of the frame members are welded to each other on one side of the entire surface in the thickness direction while another side of the entire surface in the thickness direction is not welded. The entire-surface welded portion and the partial welded portion are present at different portions on an outer periphery of the joint portion.

6 Claims, 9 Drawing Sheets

PERIPHERAL DIRECTION OF RESIN FRAME

FIG. 8A
FIG. 8B
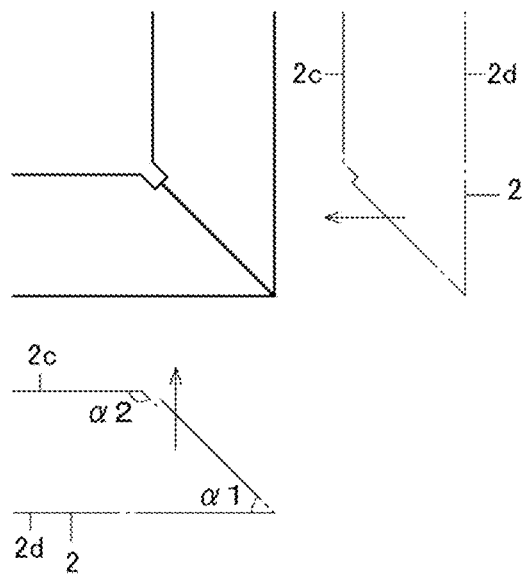
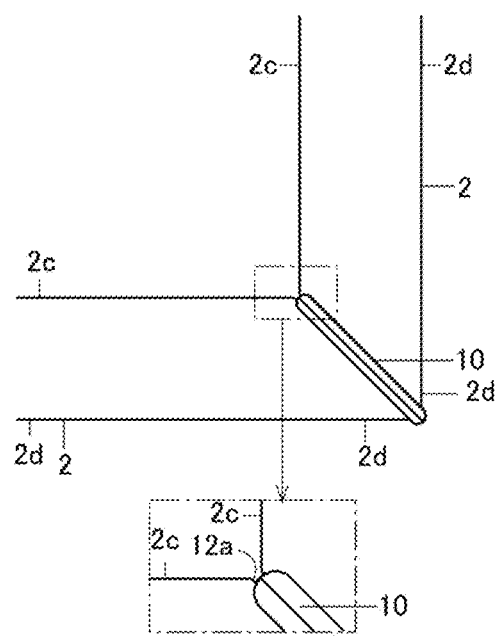

RESIN FRAME AND FITTING

CROSS REFERENCE TO RELATED APPLICATIONS

This application is based on Japanese Patent Application (No. 2018-109973) filed on Jun. 8, 2018, the contents of which are incorporated herein by way of reference.

BACKGROUND

The present invention relates to a frame-shaped resin frame (frame made from resin) including a corner portion. More specifically, the present invention relates to a resin frame in which a frame member is combined into a frame shape that includes a corner portion, and a partition member is provided inside the frame shape to partition front and rear portions. The present invention also relates to a fitting that includes the resin frame and the partition member, and a resin frame manufacturing method.

There is an example of a resin frame manufacturing method which includes: a melting process, in which end surfaces of two frame members are heated, and end portions of the frame members are melted as welding margins; a welding process, in which the welding margins are abutted against each other and welded; and a removing process, in which outer peripheral portions of the welding margins which protrude on an outer surface side of the frame members (portions rising from an outer surface) during the abutting are removed (Patent Literature 1: Japanese Patent No. 4926016).

There is another example of the resin frame manufacturing method, which includes: a cutting process, in which outer surface sides of end surfaces of two frame members are cut while inner surface sides are left intact without being cut, and only the inner surface sides are used as welding margins while the outer surface sides of the end surfaces serve as unwelded portions; a melting process, in which remaining portions of the end surfaces are heated and melted as the welding margins; and a welding process, in which the welding margins are abutted against each other and welded (Patent Literature 2: Japanese Patent No. 2540218).

SUMMARY

A resin frame according to an aspect of the present invention is a resin frame including:
frame members combined into a frame shape that includes a corner portion; and
a joint portion joining a pair of the frame members which are adjacent to each other at the corner portion, wherein
each of the frame members is configured to be provided with a partition member inside the frame shape to partition front and rear portions,
the frame member includes a plate portion,
end surfaces of the pair of the frame members are abutted at the joint portion to be jointed to each other,
the joint portion includes:
an entire-surface welded portion, in which the end surfaces of the pair of the frame members are welded to each other over an entire surface in a thickness direction of the plate portion; and
a partial welded portion, in which the end surfaces of the pair of the frame members are welded to each other on one side of the entire surface in the thickness direction of the plate portion while another side of the entire surface in the thickness direction is not welded, and
the entire-surface welded portion and the partial welded portion are present at different portions on an outer periphery of the joint portion.

The resin frame may be configured such that
the partial welded portion is provided on an inner surface portion of the pair of the adjacent frame members in the joint portion,
the entire-surface welded portion is provided on at least one of three surface portions of the pair of the adjacent frame members other than the inner surface portion, the three surface portions including a front surface portion, a rear surface portion and an outer surface portion, and
the partial welded portion on the inner surface portion of the pair of the adjacent frame members includes an unwelded portion on an inner surface side of the partial welded portion.

The resin frame may be configured such that
the frame member includes a hollow portion which serves as a main body, and a plurality of inner protruding portions, provided at intervals in a front-rear direction, which protrude from an inner surface among surfaces of the hollow portion,
a recessed portion opened toward an inner inside of the resin frame is formed by a pair of the inner protruding portions adjacent in the front-rear direction and the hollow portion, and the partial welded portion is provided in the recessed portion in the joint portion.

The resin frame may be configured such that
the hollow portion includes:
a first step portion disposed on at least one side, including a rear side and a front side, of an outer surface portion of the hollow portion;
a second step portion disposed closer, than the first step portion, to an intermediate portion side in the front-rear direction, the second step portion being disposed at an outer side of the resin frame than the first step portion; and
a stepped portion that connects the first step portion and the second step portion in a stepped shape, and
the entire-surface welded portion is provided on the first step portion and the second step portion in the joint portion.

The resin frame may be configured such that
the pair of the adjacent frame members includes:
a planar surface portion formed along a peripheral direction of the resin frame;
a bent surface portion that bends along the peripheral direction of the resin frame; and
a thickness-increased portion with respect to the planar surface portion or the bent surface portion in the joint portion, and
the thickness-increased portion is located at a boundary position between the entire-surface welded portion and the partial welded portion.

A fitting according to an aspect of the present invention is a fitting, including:
the resin frame; and the partition member held by the resin frame.

A manufacturing method of a resin frame in which end surfaces of a plurality of frame members provided with plate portions are abutted and welded against each other and the frame members are combined into a frame shape having a corner portion, according to an aspect of the present invention is a manufacturing method including:
a step of cutting, in which a pair of frame members among the plurality of the frame members, which are adjacent to each other at the corner portion, are recessed in a stepped shape by cutting another side with respect to one side of a second portion in a thickness direction of a plate portion, the second portion being different from a first portion located in an outer periphery of end surfaces of the pair of the frame members;

a step of melting, in which the end surfaces of the pair of the frame members are heated, the entire end surfaces are melted as a welding margin in the first portion, and one side of the end surfaces is melted as a welding margin in the second portion;

a step of welding, in which the welding margins on the end surfaces of the pair of the frame members are abutted and welded against each other, wherein a portion of the welding margin protrudes on an outer peripheral side with respect to a position of the original end surfaces of the frame members in the first portion; and a step of removing, in which a portion of the welding margin that protrudes in the welding process is removed.

BRIEF DESCRIPTION OF DRAWINGS

FIGS. 8A and 8B are explanatory diagrams showing a state at a moment when a pair of frame members viewed from the front-rear direction is abutted against each other and a state after the pair of frame members are abutted against each other and welded.

DETAILED DESCRIPTION OF EXEMPLIFIED EMBODIMENTS

In the manufacturing method of Patent Literature 1, since the entire end surfaces are used as the welding margins, joining strength of the two frame members is high. In the manufacturing method of Patent Literature 1, since a portion of the welding margin protrudes to the outer surface side of the frame member during the abutting in the welding process, appearance of the outer surface of the frame member is temporarily deteriorated at the stage of the welding process. Therefore, in the manufacturing method of Patent Literature 1, the appearance of the outer surface of the frame member is optimized by the removing process. However, since the joining strength is high in the manufacturing method of Patent Literature 1, the removing process may be omitted if the appearance is not required.

As compared with the manufacturing method of Patent Literature 1, in the manufacturing method of Patent Literature 2, the outer surface side of the frame member serves as the unwelded portion in the cutting process, thus the appearance of the outer surface of the frame member is improved without performing the removing process. However the joining strength is reduced since a quantity of the welding margin is low.

The present invention is made in view of the above circumstances, and an object of the present invention is to harmonize the joining strength of the resin frame with the appearance of the resin frame at a desired level.

Figure 3:
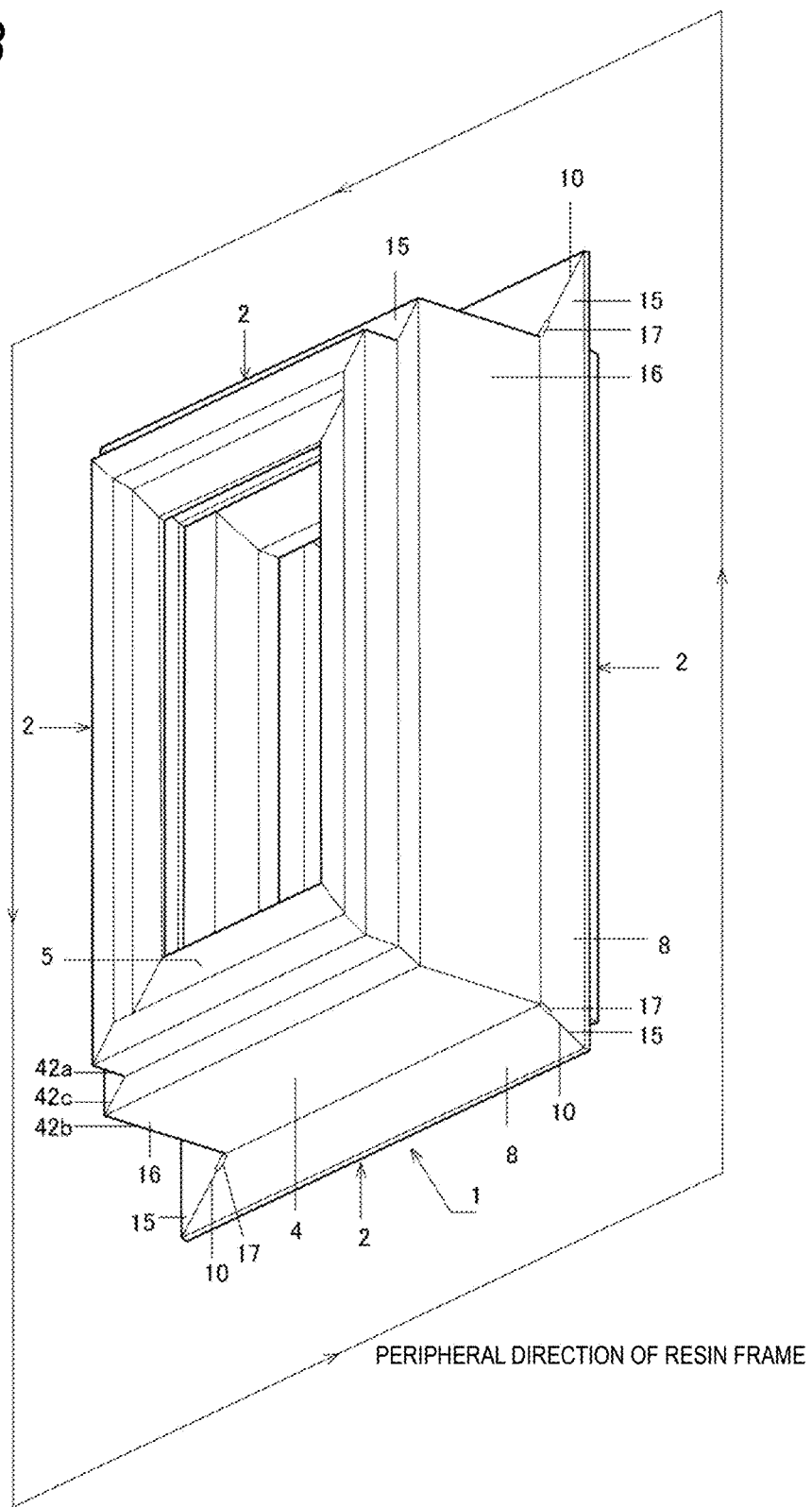
FIG. 3 is a perspective view showing the entire resin frame of the first embodiment.

As shown in FIG. 3, a resin frame 1 according to a first embodiment of the present invention is formed in a rectangular shape as an example of a frame shape including corner portions when viewed in a front-rear direction. In FIG. 3, dimensions of the resin frame 1 in an up-down direction and a left-right direction are made extremely shorter than actual dimensions when viewed from the front-rear direction. Although not shown, a partition member that partitions front and rear portions is disposed inside the resin frame 1. The partition member may be a door or a slide sash that is attached to the resin frame 1 so as to be opened and closed. In the present embodiment, it is assumed that the partition member is a sash (sliding sash), and the resin frame 1 is a window frame.

More specifically, the resin frame 1 of the present embodiment is a main portion of the window frame, and other members are fixed on an inner surface side of the resin frame 1. The resin frame 1 and the other members are integrated to form a rectangular window frame. In the present embodiment, a fitting is formed by the resin frame 1 and the partition member held by the resin frame 1.

Figure 2:
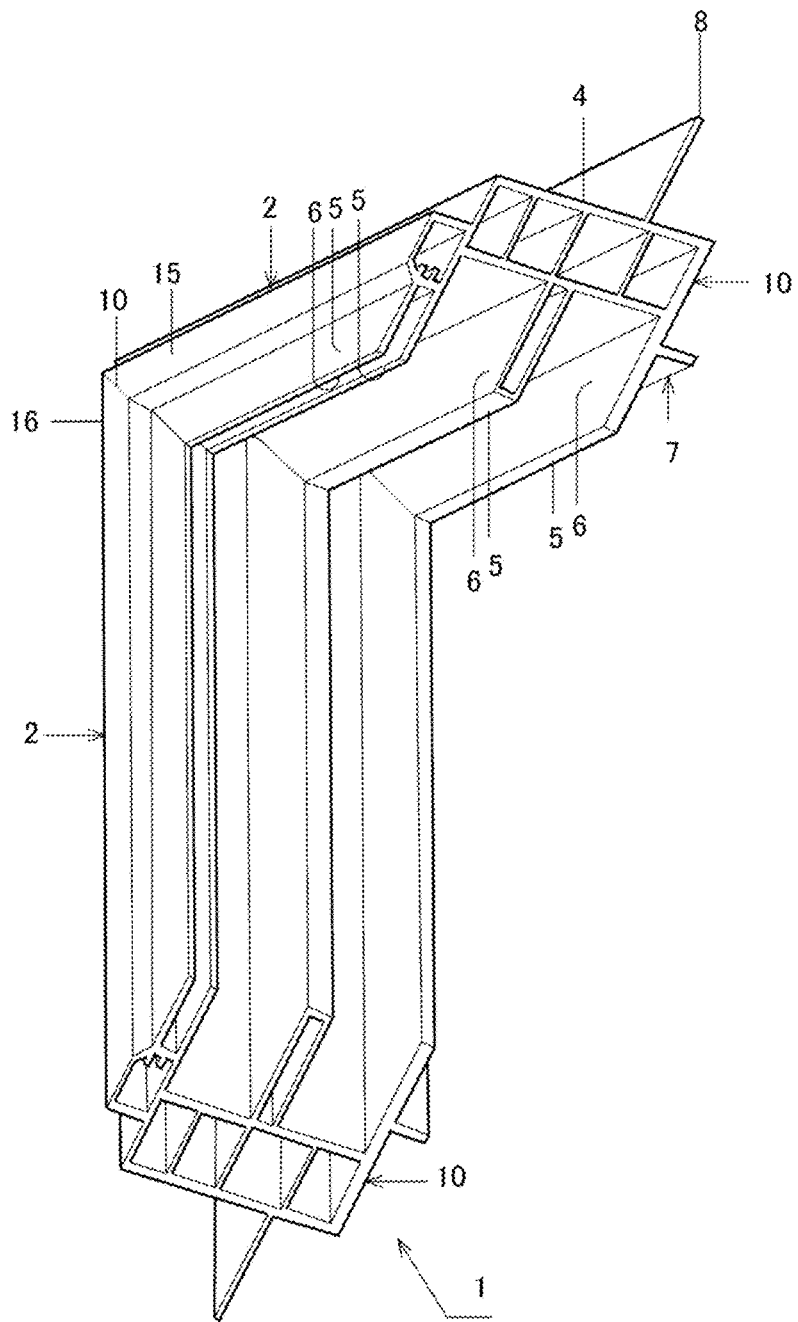
FIG. 2 is a perspective view showing a portion of a resin frame of a first embodiment.

In the present embodiment, the resin frame 1 includes four frame members 2. Two frame members 2 of the four frame members 2 extend in the up-down direction and face each other at intervals in the left-right direction. The other two frame members 2 of the four frame members 2 extend in the left-right direction and face each other at intervals in the up-down direction. In the present embodiment, end surfaces of the four frame members 2 have the same shape. In FIG. 2, the frame member 2 on a left side and the frame member 2 on a lower side when viewed from the front-rear direction are shown.

The frame member 2 is an extruded shape material made of resin. The four frame members 2 are combined into a rectangular shape with respective end surfaces abutting against each other. Therefore, when viewed from the front-rear direction, the end surface of the frame members 2 is inclined with respect to an extending direction thereof (a direction in which the frame member 2 is extruded from a mold). When viewed from the front-rear direction, an inclination angle is 45 degrees with respect to the up-down direction.

Terms used in the following description are defined as follows.

An "inner side of the resin frame 1" is an inner side of the rectangle (a frame shape including a corner portion) with respect to the resin frame 1 formed in the rectangular shape (the frame shape including the corner portion) when viewed in the front-rear direction.

An "outer side of the resin frame 1" is an outer side of the rectangle (the frame shape including the corner portion) with respect to the resin frame 1 formed in the rectangular shape (the frame shape including the corner portion) when viewed in the front-rear direction.

An "inside-outside direction" is a direction that coincides with a direction facing the inner side of the resin frame 1 and a direction facing the outer side of the resin frame 1.

When the resin frame 1 is disposed at a boundary between indoor space and outdoor space, an indoor-outdoor direction coincides with the front-rear direction.

A "surface of the resin frame 1" is formed of four surfaces. The "four surfaces" include an inner surface of the resin frame 1 and three surfaces other than the inner surface of the resin frame 1. The "surfaces other than the inner surface of the resin frame 1" refers to three surfaces including a front surface, a rear surface, and an outer surface. A "surface of the frame member 2" refers to a surface that is visible from outside when the frame members 2 are combined into the resin frame 1.

The "inner surface of the resin frame 1" is a surface seen when the resin frame 1 is viewed from the inner side thereof. An "inner surface of the frame member 2" is a surface corresponding to the inner surface of the resin frame 1, for example, a right side surface of the frame member 2 on the left side, or an upper surface of the frame member 2 on the lower side.

The "front surface of the resin frame 1" is a surface seen when the resin frame 1 is viewed from a front side thereof. Similarly, the "front surface of the frame member 2" is a surface seen when the resin frame 1 is viewed from the front side thereof.

The "rear surface of the resin frame 1" is a surface seen when the resin frame 1 is viewed from a rear side thereof. Similarly, the "rear surface of the frame member 2" is a surface seen when the resin frame 1 is viewed from the rear side thereof.

The "outer surface of the resin frame 1" is a surface seen when the resin frame 1 is viewed from the outer side thereof. In other words, the surface is a surface attached to an opening portion of a building body (not shown). An "outer surface of the frame member 2" is, for example, a left side surface of the frame member 2 on the left side, or an lower surface of the frame member 2 on the lower side.

Figure 1A:
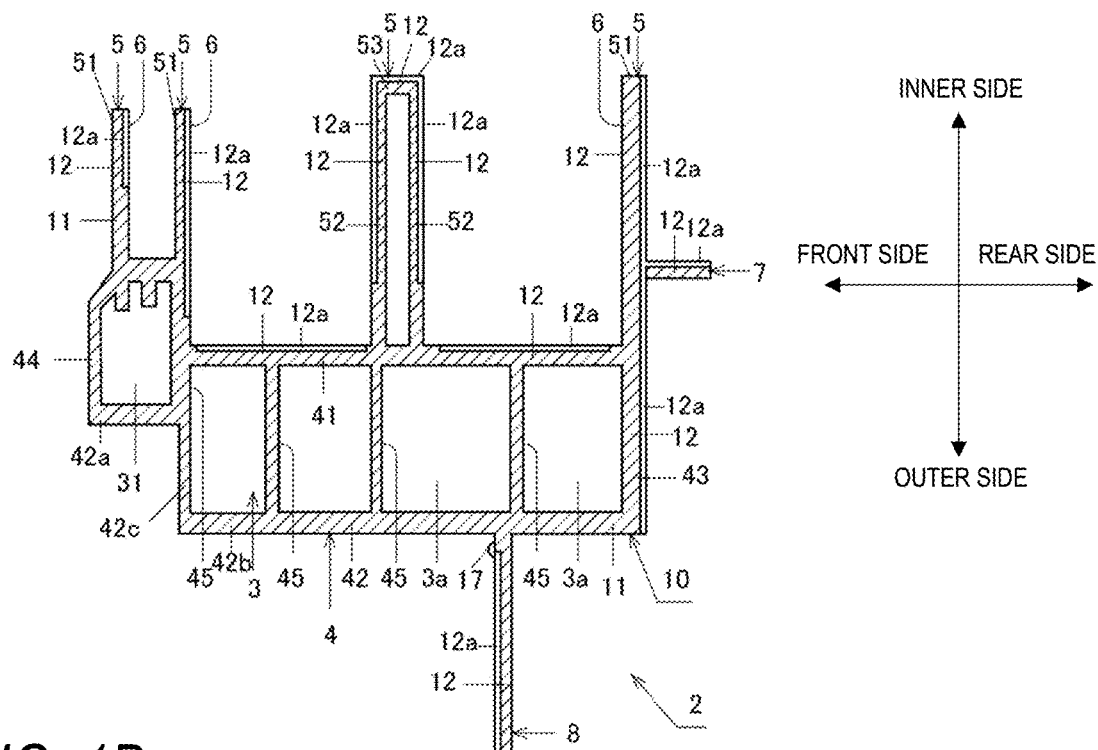
FIGS. 1A and 1B are cross-sectional views showing cross sections of a joint portion of a pair of frame members.
Figure 1B:
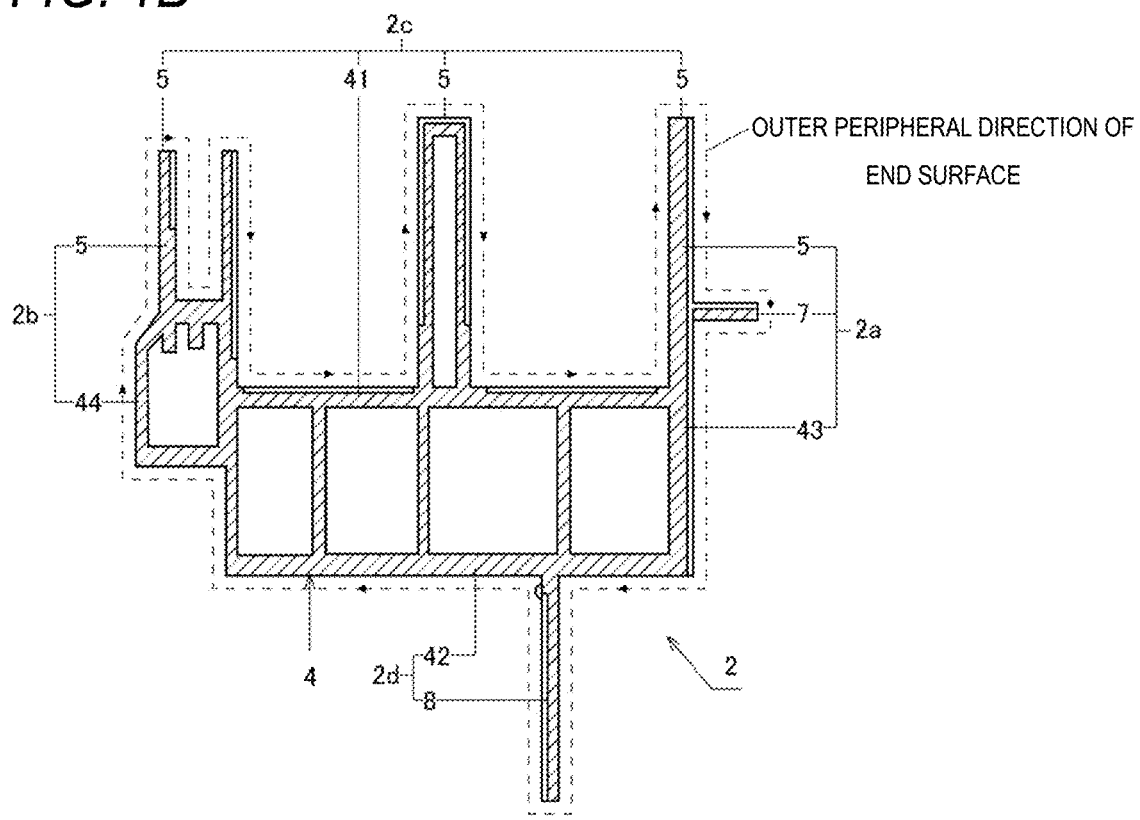

An "outer peripheral direction of the end surface of the frame member 2" is a direction that extends around an outer periphery of the end surface of the frame member 2. In FIG. 1B, an annular broken line surrounding the outer periphery of the end surface of the frame member 2 is shown, and arrows are inserted with respect to the broken line. The annular broken line and the arrows are used to facilitate visual understanding of the outer peripheral direction. In FIG. 1B, the outer peripheral direction is a so-called clockwise direction. The "outer peripheral direction" is not limited to the clockwise direction, and also includes a counterclockwise direction.

The frame member 2 has a cylindrical shape. More specifically, the frame member 2 includes a hollow portion 4 serving as a main body.

The hollow portion 4 includes an internal space portion 3. The hollow portion 4 is a polygonal cylinder. The hollow portion 4 includes: an inner plate 41 and an outer plate 42 that are oppositely provided at intervals in an inside-outside direction of the resin frame 1; and a rear plate 43 and a front plate 44 which respectively connect the inner plate 41 and the outer plate 42 at front and rear ends. Each of the rear plate 43 and the front plate 44 extends in the front-rear direction and are bent in the inside-outside direction. The hollow portion 4 includes a partition plate 45 that partitions the internal space portion 3 in the front-rear direction. Therefore, the internal space portion 3 includes a plurality of space portions 3a partitioned in the front-rear direction by the partition plate 45. The partition plate 45 connects the inner plate 41 and the outer plate 42 in the inside-outside directions of the resin frame 1 in a range between the rear plate 43 and the front plate 44.

The frame member 2 is formed by molding thermoplastic resin. Examples of the thermoplastic resin include vinyl chloride resin, acrylic resin, and polypropylene. A molding method of the frame member 2 is a thermoplastic resin molding method, such as extrusion molding or injection molding.

The frame member 2 is formed by combining plate portions of the end surfaces of the frame member 2. In other words, the frame member 2 is formed by combining the plate portions extending in the longitudinal direction thereof. The plate portions include the inner plate 41, the outer plate 42, the rear plate 43, the front plate 44, and the partition plate 45 described above. Since the frame member 2 is provided with the plate portions, the frame member 2 has a thickness direction. The thickness direction of the hollow portion 4 is the thickness direction of the inner plate 41, the outer plate 42, the rear plate 43, and the front plate 44 constituting the hollow portion 4.

Portions of an outer surface of the hollow portion 4, which are adjacent to each other in the front-rear direction, are formed in a stepped shape in the inside-outside directions. This stepped shape corresponds to a shape of the outer plate 42 (a shape extended in the front-rear direction and bent in the inside-outside direction). More specifically, the outer plate 42 of the hollow portion 4 includes: a first step portion 42a disposed at a front end portion; a second step portion 42b disposed closer, than the first step portion 42a, to an intermediate portion side in the front-rear direction, the second step portion 42b being disposed at an outer side of the resin frame 1 than the first step portion 42a; and a stepped portion 42c that connects the first step portion 42a and the second step portion 42b in the stepped shape.

Therefore, the outer surface of the surface of the hollow portion 4 includes: a first outer surface, which is located in the first step portion 42a in a direction orthogonal to a longitudinal direction of the hollow portion 4 when viewed from the front-rear direction and is facing to the outer side of the resin frame 1; a second outer surface, which is located in the second step portion 42b and is facing to the same direction as the first step portion 42a; and a stepped surface connecting the first outer surface and the second outer surface in the stepped shape, which is facing to the front side.

The frame member 2 includes, in addition to the hollow portion 4, a plurality of inner protruding portions 5 protruding from an inner surface of the surface of the hollow portion 4 (inner surface of the inner plate 41) at intervals in the front-rear direction. In the example of FIG. 1, there are four inner protruding portions 5. The inner surface side of the frame member 2 is provided with recessed portions 6 that open toward the inner side of the resin frame 1 (an upper side in FIG. 1, that is, a partition member side which is not shown). Three recessed portions 6 are formed in the example of FIG. 1. The recessed portion 6 is formed by a pair of inner protruding portions 5 that are adjacent to each other in the front-rear direction and the hollow portion 4.

In the example of FIG. 1, a first, a second, and a fourth inner protruding portions 5 that protrude from the front side toward the rear side are plates 51 that protrudes from the hollow portion 4 (the inner plate 41) toward the inner side of the resin frame 1. The plates 51 are plate portions that form the frame member 2. A third inner protruding portion 5 that protrudes from the front side to the rear side is a polygonal cylinder. More specifically, the third inner protruding portion 5 has a U-shape that opens toward the outer side of the resin frame 1. Both ends of the U-shape are joined to the inner surface of the hollow portion 4. More specifically, the third inner protruding portion 5 includes two plates 52 protruding at intervals in the front-rear direction from the inner surface of the hollow portion 4 and a plate 53 stretched between tip portions of the two plates 52. The plates 52 and the plate 53 are also plate portions that form the frame member 2.

The frame member 2 includes a rear protruding portion 7 that protrudes from a rear surface of the rearmost inner protruding portion 5. The rear protruding portion 7 is a plate extending in the front-rear direction. The inner protruding portion 7 is also a plate portion that forms the frame member 2. The rearmost inner protruding portion 5 and the rear plate 43 extend integrally in a plate shape along the inside-outside direction of the resin frame 1. The rear surface of the rearmost inner protruding portion 5 and a rear surface of the rear plate 43 are one continuous planar surface, and an intermediate portion thereof in the inside-outside direction is a protruding point where the rear protruding portion 7 protrudes.

The frame member 2 includes an outer protruding portion 8 protruding from the outer surface of the hollow portion 4. The outer protruding portion 8 is a plate extending in the inside-outside direction. The outer protruding portion 8 is also a plate portion that forms the frame member 2.

As shown in FIG. 1B, the four surface portions of the frame member 2 include a rear surface portion 2a, a front surface portion 2b, an inner surface portion 2c, and an outer surface portion 2d. These four surface portions (the rear surface portion 2a, the front surface portion 2b, the inner surface portion 2c, and the outer surface portion 2d) are portions based on the hollow portion 4.

The rear surface portion 2a of the frame member 2 corresponds to a rear surface portion of the resin frame 1 viewed from the front-rear direction. The rear surface portion 2a of the frame member 2 is configured by: the rear plate 43, which is a rear surface portion of the hollow portion 4; the rearmost inner protruding portion 5; and the rear protruding portion 7.

The front surface portion 2b of the frame member 2 corresponds to a front surface portion of the resin frame 1 viewed from the front-rear direction. The front surface portion 2b of the frame member 2 is configured by: the front plate 44, which is a front surface portion of the hollow portion 4 and the foremost inner protruding portion 5.

The inner surface portion 2c of the frame member 2 corresponds to an inner surface portion of the resin frame 1 viewed from the front-rear direction. The inner surface portion 2c of the frame member 2 is configured by: the inner plate 41, which is an inner surface portion of the hollow portion 4 and all of the inner protruding portions 5.

The outer surface portion 2d of the frame member 2 corresponds to an outer surface portion of the resin frame 1 viewed from the front-rear direction. The outer surface 2d of the frame member 2 is configured by: the outer plate 42, which is an outer surface portion of the hollow portion 4, and the outer protruding portion 8.

Since the foremost inner protruding portion 5 is disposed at a boundary between the inner surface portion (the inner plate 41) of the hollow portion 4 and the front surface portion (the front plate 44) of the hollow portion 4, the foremost inner protruding portion 5 is a portion of the inner surface portion 2c of the frame member 2 and is also a portion of the front surface portion 2b of the frame member 2. Since the rearmost inner protruding portion 5 is disposed at a boundary between the inner surface portion (the inner plate 41) of the hollow portion 4 and the rear surface portion (the rear plate 43) of the hollow portion 4, the rearmost inner protruding portion 5 is a portion of the inner surface portion 2c of the frame member 2 and is also a portion of the rear surface portion 2a of the frame member 2.

Four frame members 2 are combined to form the resin frame 1. A joint portion 10 is provided to join a pair of frame members 2 in the resin frame 1, which are adjacent to each other at a corner portion of the rectangle, through abutting end surfaces of the pair of the frame members against each other. Since the frame member 2 is formed by combining the plate portions as described above, the frame member 2 has a thickness.

With respect to the thickness direction, the joint portion 10 includes: an entire-surface welded portion 11, in which the end surfaces of the pair of frame members 2 are welded to each other over an entire surface in the thickness direction of the plate portion; and a partial welded portion 12, in which the end surfaces of the pair of frame members 2 are welded to each other on one side of the entire surface in the thickness direction of the plate portion while another side of the entire surface is in an opposing unwelded state.

In FIG. 1, a cross section of the joint portion 10 is shown. In FIG. 1, a portion that is not hatched in the thickness direction of the plate portion is shown so that a partial welded portion 12 and an entire-surface welded portion 11 can be distinguished from each other. A portion indicated by hatching on the entire surface of the plate portion in the thickness direction is the entire-surface welded portion 11. A portion, in which one side of the plate portion in the thickness direction is hatched and the other side in the thickness direction is not hatched, is the partial welded portion 12. The hatched portion is a portion in which the end surfaces of the pair of frame members 2 are opposite to each other in an unwelded state, that is, an unwelded portion 12a.

The partial welded portion 12 and the entire-surface welded portion 11 are formed at different portions of an outer periphery of the joint portion 10 on the inner surface of the surface of the pair of adjacent frame members 2 in the joint portion 10. The different portions of the outer periphery of the joint portion 10 correspond to different portions in an outer peripheral direction on the end surface of the frame member 2 in an original state of the frame member 2 before being combined into the resin frame 1.

Both the partial welded portion 12 and the entire-surface welded portion 11 are present in the inner surface portion 2c of the frame member 2. In view of a volume ratio, a volume of the partial welded portion 12 is more than a volume of the entire-surface welded portion 11. The details are as follows.

As described above, the inner surface portion 2c of the frame member 2 is configured by the inner surface portion of the hollow portion 4 and all of the inner protruding portions 5. The inner surface portion 2c of the frame member 2 includes three recessed portions 6.

The front recessed portion 6 is formed by the foremost (first) inner protruding portion 5, the second inner protruding portion 5 from the front side, and the hollow portion 4. In the front recessed portion 6, the partial welded portion 12 is provided on the first inner protruding portion 5 and the second inner protruding portion 5, while the entire-surface welded portion 11 is provided on the inner surface portion (the inner plate 41) of the hollow portion 4. The entire-surface welded portion 11 is provided on a portion of the first inner protruding portion 5 located on a side of the hollow portion 4.

The middle recessed portion 6 is formed by the second inner protruding portion 5, the third inner protruding portion 5, and the hollow portion 4. In the middle recessed portion 6, the partial welded portion 12 is provided on the second inner protruding portion 5, the third inner protruding portion 5, and the inner surface portion of the hollow portion 4. In the middle recessed portion 6, the entire-surface welded portion 11 is provided on a continuous corner portion formed by bending the second inner protruding portion 5 and the inner surface portion of the hollow portion 4, and in a continuous corner portion formed by bending the third inner protruding portion 5 and an outer peripheral surface portion of the hollow portion 4.

The rear recessed portion 6 is formed by the third inner protruding portion 5, the rearmost (fourth) inner protruding portion 5, and the hollow portion 4. In the rear recessed portion 6, the partial welded portion 12 is provided on the third inner protruding portion 5, the fourth inner protruding portion 5, and the inner surface portion of the hollow portion 4. In the rear recessed portion 6, the entire-surface welded portion 11 is provided on a continuous corner portion formed by bending the third inner protruding portion 5 and the inner surface portion of the hollow portion 4.

The unwelded portion 12a is provided on an inner surface of the recessed portion 6. The details are as follows.

The first inner protruding portion 5 is a plate as described above. The unwelded portion 12a is provided on a surface facing to the second inner protruding portion 5.

The second inner protruding portion 5 is a plate as described above. The unwelded portion 12a is provided on a surface facing to the third inner protruding portion 5.

The third inner protruding portion 5 has the U-shape that opens toward the outer side of the resin frame 1 as described above. The unwelded portion 12a is provided on a surface facing to the second inner protruding portion 5, a surface facing to the fourth inner protruding portion 5, and on the inner surface side of the resin frame 1.

The unwelded portion 12a is provided on an inner surface side of the inner surface portion of the hollow portion 4 (the inner plate 41).

Both the partial welded portion 12 and the entire-surface welded portion 11 are present in the outer surface portion 2d of the frame member 2. In view of a volume ratio, a volume of the entire-surface welded portion 11 is more than a volume of the partial welded portion 12. The details are as follows.

The outer surface portion (the outer plate 42) of the hollow portion 4 is formed by the first step portion 42a, the second step portion 42b, and the stepped portion 42c. In the outer surface portion of the hollow portion 4, the entire-surface welded portion 11 is formed in the first step portion 42a, the second step portion 42b, and the stepped portion 42c.

The partial welded portion 12 is formed in the outer protruding portion 8. The unwelded portion 12a is provided on a front surface side of the outer protruding portion 8. In the outer protruding portion 8, the entire-surface welded portion 11 is provided on a portion that is continuous with the outer surface portion (the outer plate 42) of the hollow portion 4.

Both the partial welded portion 12 and the entire-surface welded portion 11 are present in the front surface portion 2b of the frame member 2. In view of a volume ratio, a volume of the entire-surface welded portion 11 is more than a volume of the partial welded portion 12. The details are as follows.

The entire-surface welded portion 11 is provided on the front surface portion (the front plate 44) of the hollow portion 4. In the foremost inner protruding portion 5, the entire-surface welded portion 11 is provided on a portion located on the side of the hollow portion 4 (a portion continuous with the hollow portion 4), while the partial welded portion 12 is provided on an inner side (a side of a protruding tip portion) as described above.

The partial welded portion 12 is present in the rear surface portion 2a of the frame member 2, but the entire-surface welded portion 11 is not present. The details are as follows.

The partial welded portion 12 is provided on the rear surface portion 2a (the rear plate 43) of the hollow portion 4, the rearmost inner protruding portion 5 and the rear protruding portion 7. The unwelded portion 12a is provided on a rear surface side of the rear surface portion (the rear plate 43) of the hollow portion 4, and an inner surface side of the rear protruding portion 7.

In the above description, it is described on which portions of the frame member 2 the partial welded portion 12 and the entire-surface welded portion 11 are present. When extracting a relationship between the content described above and the hollow portion 4, it is noted that the entire-surface welded portion 11 is present on the outer surface portion and the front surface portion of the hollow portion 4, while the partial welded portion 12 is present on the inner surface portion and the rear surface portion. Both the partial welded portion 12 and the entire-surface welded portion 11 are present on the inner surface portion of the hollow portion 4. In view of a volume ratio, a volume of the partial welded portion 12 is more than a volume of the entire-surface welded portion 11.

Therefore, in the present embodiment, the partial welded portion 12 is present in the inner surface portion 2c of the pair of adjacent frame members 2 in the joint portion 10, and the entire-surface welded portion 11 is present in at least one of the three surface portions of the pair of adjacent frame members 2 other than the inner surface portion 2c including the front surface portion 2b, the rear surface portion 2a, and the outer surface portion 2d.

As shown in FIG. 3, the surfaces of the pair of adjacent frame members 2 include: a planar surface portion 15 that extends along the peripheral direction of the resin frame 1 via the joint portion 10; a bent surface portion 16 that bends along the peripheral direction of the resin frame 1 with the joint portion 10 serving as a boundary; and a thickness-increased portion 17 that rises with respect to the planar surface portion 15 or the bent surface portion 16 in the joint portion 10.

The planar surface portion 15 is formed on front surfaces of a pair of stepped portions 42c of the pair of adjacent frame members 2, for example, and is located on a plane orthogonal to the front-rear direction.

The bent surface portion 16 is formed on outer surfaces of a pair of first step portions 42a of the pair of adjacent frame members 2 or outer surfaces of a pair of second step portions 42b, for example. The bent surface portion 16 formed on the outer surfaces of the pair of first step portions 42a or the bent surface portion 16 formed on the outer surfaces of the pair of second step portions 42b is orthogonal to a plane orthogonal to the inside-outside direction and a plane orthogonal to the front-rear direction.

The thickness-increased portion 17 is present at a boundary position between the entire-surface welded portion 11 and the partial welded portion 12 in the joint portion 10. In the present embodiment, the thickness-increased portion 17 is formed in a pair of outer protruding portions 8 of the pair of adjacent frame members 2. In addition to the thickness-increased portion 17, the planar surface portion 15 is also formed in the pair of outer protruding portions 8.

A rear surface and a front surface of the outer protruding portion 8 are planes orthogonal to the front-rear direction (except for the front-rear direction of the joint portion 10). As shown in FIG. 1A, the pair of adjacent outer protruding portions 8 includes the partial welded portion 12 and the thickness-increased portion 17, and the partial welded portion 12 is disposed on a relatively outer side of the resin frame 1 than the thickness-increased portion 17.

A method of forming the entire-surface welded portion 11 is described by a method of abutting and welding a pair of plate members 20 in a straight line. Meanwhile, a method of forming the entire-surface welded portion 11 in the resin frame 1 is a method of abutting and welding a pair of frame members 2 in a direction orthogonal to each other. The frame member 2 is formed by combining the plate portions. Although abutting directions are different, the method of forming the entire-surface welded portion 11 using the pair of frame members 2 can be understood through describing the method of forming the entire-surface welded portion 11 using the pair of plate members 20. The plate member 20 has a laminated structure using different resin in the thickness direction. A main body layer 20a is provided on one side in the thickness direction (a lower side in the figure) and a coating layer 20b that covers the main body layer 20a is provided on another side in the thickness direction. The main body layer 20a is thicker than the coating layer 20b. As shown in FIG. 4, the method of forming the entire-surface welded portion 11 is performed in a following order from (1) to (6).

Figure 4A:
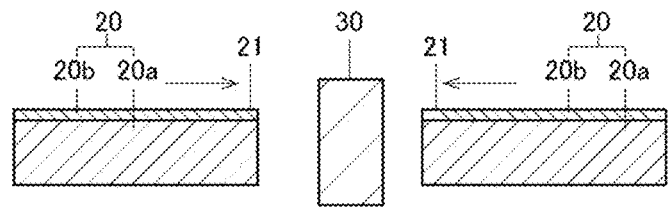
FIGS. 4A to 4F are explanatory diagrams showing a portion of a resin frame manufacturing method according to the first embodiment of the present invention.

(1) As shown in FIG. 4A, end surfaces of the pair of plate members 20 are brought close to a heater 30. In the figure, an upper surface and a lower surface of surfaces of the plate member 20 are planar surfaces.

Figure 4B:
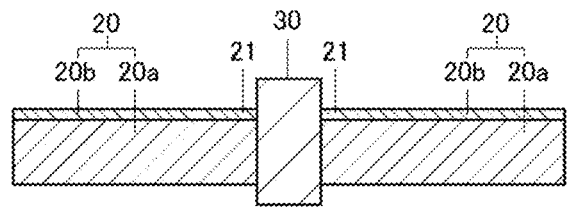

(2) As shown in FIG. 4B, the entire end surfaces of the pair of plate members 20 are pressed against the heated heater 30 and heated.

Figure 4C:
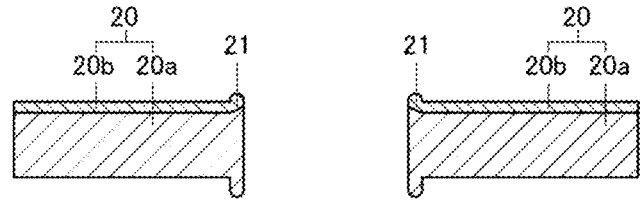

(3) When the entire end surfaces of the pair of plate members 20 are sufficiently heated, end portions of the pair of plate members 20 including the entire end surfaces are melted to form a welding margin 21. As shown in FIG. 4C, a portion of the welding margin 21 of each plate member 20 protrudes toward an outer peripheral side with respect to a position of the original end surface. Thereafter, the pair of plate members 20 are separated from the heater 30.

Figure 4D:
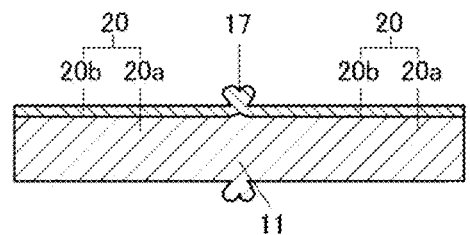

(4) As shown in FIG. 4D, a pair of welding margins 21 is abutted and welded. Then, a portion of the welding margin 21 protrudes to a surface side of the plate member 20 (raised state). In the figure, the portion of the welding margin 21 protrudes upward and downward with respect to the upper surface and the lower surface of the plate member 20 which are planar surfaces.

Figure 4E:
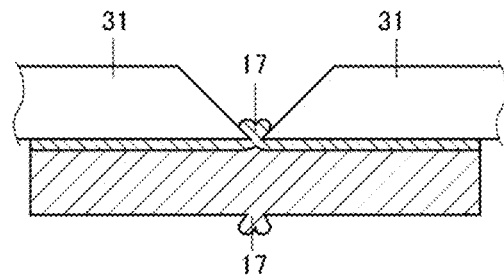

(5) As shown in FIG. 4E, the portion of the welding margin 21 protruding from the surface of the pair of plate members 20 (the portion of the welding margin 21 protruding from the upper surface of the plate member 20 in the figure(the thickness-increased portion 17)) is clamped by a pair of blades 31.

Figure 4F:
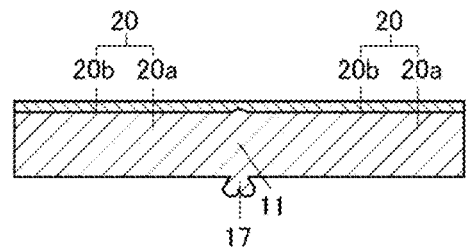

(6) The pair of blades 31 clamps the portion of the welding margin 21 and separates the portion of the welding margin 21 from the pair of plate members 20, so that the portion of the welding margin 21 (the thickness-increased portion 17) is removed from the pair of plate members 20, and a portion (upper surface) of the surface of the pair of plate members 20 serves as the planar surface portion 15 as shown in FIG. 4F. A portion where the end surfaces of the pair of plate members 20 are abutted and joined together is the joint portion 10. The covering layer 20b covers the main body layer 20a in the joint portion 10. In the planar surface portion 15, the joint portion 10 may be raised with respect to the vicinity thereof to a degree that cannot be distinguished by a naked eye. Therefore, the planar surface portion 15 has a surface roughness that can be determined as a planar surface by the naked eye.

A method of forming the partial welded portion 12 is also described by a method of abutting and welding a pair of plate members 20 in a straight line in which a pair of plate members 20 are used. The method of forming the partial welded portion 12 using the pair of frame members 2 can be understood through describing the method of forming the partial welded portion 12 using the pair of plate members 20. As shown in FIG. 5, the method of forming the partial welded portion 12 is performed in a following order from (1) to (5).

Figure 5A:
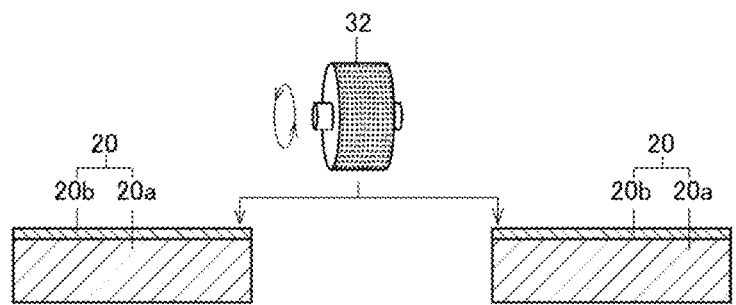
FIGS. 5A to 5E are explanatory diagrams showing a portion of the resin frame manufacturing method according to the first embodiment of the present invention.

(1) As shown in FIG. 5(a), an end portion located on a side on which the pair of plate members 20 are abutted against each other is cut by a cutting tool 32 from another side (a coating layer 20b side) in the thickness direction to leave the one side (a main body layer 20a side) as the welding margin 21. In the figure, the upper surface and the lower surface of the surfaces of the plate member 20 before the cutting are planar surfaces. Then, a portion of the main body layer 20a is cut from the upper surface side (the coating layer 20b side).

Figure 5B:
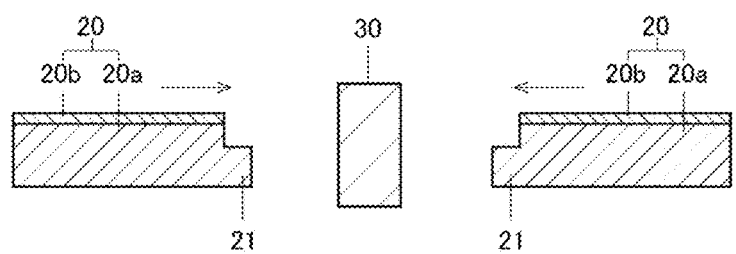

(2) As shown in FIG. 5B, end surfaces on a welding margin 21 side of the pair of plate members 20 are brought close to the heater 30.

Figure 5C:
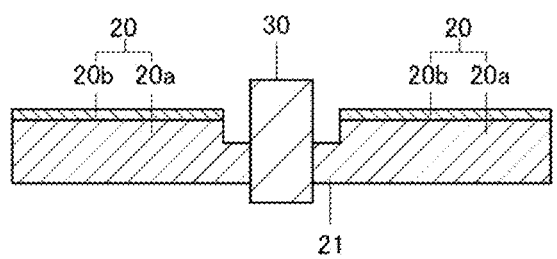

(3) As shown in FIG. 5C, the entire end surfaces of the pair of plate members 20 are pressed against the heated heater 30 and heated.

Figure 5D:
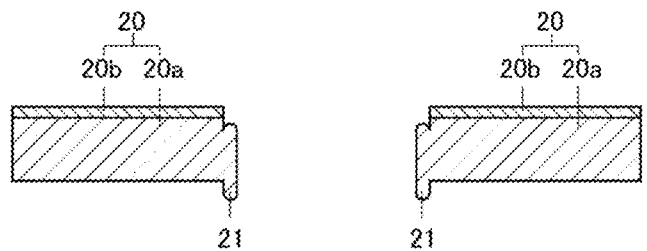

(4) When the entire end surfaces of the pair of plate members 20 are sufficiently heated, end portions of the pair of plate members 20 including the entire end surfaces are melted to form the welding margin 21. As shown in FIG. 5D, a portion of the welding margin 21 of each plate member 20 protrudes toward an outer peripheral side with respect to a position of the original end surface. Thereafter, the pair of plate members 20 is separated from the heater 30.

Figure 5E:
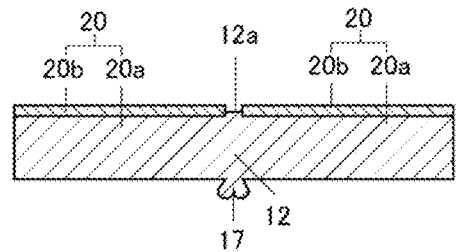

(5) As shown in FIG. 5E, a pair of welding margins 21 are abutted and welded. Then, the welding margin 21 does not protrude on the upper surface side of the plate member 20, and the pair of plate members 20 is welded. The upper surface sides of the plate members 20 are opposed to each other with a slight gap therebetween, and thus become the unwelded portion 12a. A portion of the welding margin 21 protrudes downward on a lower surface of the pair of plate members 20. Whether to remove the protruding portion is optional.

According to the resin frame 1 of the first embodiment described above, since the joint portion 10 includes the entire-surface welded portion 11 and the partial welded portion 12, the joint strength and the appearance can be harmonized at a level corresponding to a ratio of the entire-surface welded portion 11 and the partial welded portion 12. According to the resin frame 1 of the first embodiment, since the partial welded portion 12 located in the inner surface portion 2c (a portion which is difficult to be cut) of the pair of adjacent frame members 2 includes the unwelded portion 12a on an inner surface side, the appearance of the inner surface side of the resin frame 1 can be improved. Since the entire-surface welded portion 11 is provided on the front surface portion 2b and the outer surface portion 2d of the pair of adjacent frame members 2, the joining strength can be improved. According to the resin frame 1 of the first embodiment, since the partial welded portion 12 is provided in the recessed portion 6 (a portion which is difficult to be cut) that opens toward the inner side of the resin frame 1, the appearance of the recessed portion 6 of the resin frame 1 can be improved. According to the resin frame 1 of the first embodiment, the first step portion 42a, the second step portion 42b, and the stepped portion 42c are provided on the outer surface portion of the hollow portion 4. Since the first step portion 42a and the second step portion 42b are provided with the entire-surface welded portion 11, the joining strength of these step portions can be improved. According to the resin frame 1 of the first embodiment, since the planar surface portion 15 and the bent surface portion 16 are provided as surfaces along the resin frame 1 in addition to the thickness-increased portion 17, the appearance can be improved. According to the resin frame 1 of the first embodiment, the partial welded portion 12 and the entire-surface welded portion 11 are provided on the outer protruding portion 8. In view of a relative positional relationship, the partial welded portion 12 is disposed on the outer side of the resin frame 1 and the entire-surface welded portion 11 is disposed on the inner side of the resin frame 1. Compared in this relative positional relationship, the outer side of the resin frame 1 is easily noticed and the inner side of the resin frame 1 is difficult to be noticed. Since the partial welded portion 12 is disposed on the outer side of the resin frame 1 which is easily noticed, the appearance of the resin frame 1 of the first embodiment can be improved.

A manufacturing method of the resin frame 1 according to the first embodiment includes following four processes.

A first process is a preparation process of preparing four frame members 2.

A second process is a cutting process in which a predetermined pair of frame members 2 among the four frame members 2, which are adjacent to each other at a corner portion of the rectangle, are recessed in a stepped shape by cutting another side with respect to one side of a second portion in a thickness direction of a plate portion. The second portion is different from a first portion located in an outer peripheral direction of the end surfaces of the pair of the frame members 2. The first portion corresponds to the entire-surface welded portion 11 of the joint portion 10, while the second portion corresponds to the partial welded portion 12 of the joint portion 10. A cut portion of the frame member 2 in the longitudinal direction of the frame member 2 is an end portion including an end surface. The end portions of the predetermined pair of adjacent frame members 2 may be cut together or separately. This cutting process may be performed before the first process or may be performed after the first process.

A third process is a melting process in which the end surfaces of the pair of frame members 2 are heated, the entire end surfaces are melted as the welding margin 21 in the first portion, and one side of the end surfaces is melted as the welding margin 21 in the second portion. As described in the method of forming the partial welded portion 12 or the method of forming the entire-surface welded portion 11, the end portions of the frame member 2 including the end surfaces of the frame member 2, except for portions which will serve as the unwelded portion 12a, are melted by heating the end surfaces of the frame member 2 with the heater 30.

A fourth process is a welding process in which the welding margins 21 on the end surfaces of the pair of frame members 2 are abutted against each other and welded. Then, a portion of the welding margin 21 protrudes toward the outer peripheral side with respect to the position of the original end surface of the frame member 2 in the first portion, while a portion of the welding margin 21 protrudes toward the outer peripheral side with respect to the position of the original end surface of the frame member 2 in a portion located on an opposite side of the unwelded portion 12a in the second portion, thus the thickness-increased portions 17 are formed.

A fifth process is a removing process in which the portion of the welding margin 21 that protrudes in the welding process (thickness-increased portion 17) is removed. Any of the thickness-increased portions 17 may be removed.

According to the manufacturing method of the resin frame 1 of the first embodiment, in the cutting process, the other side in the thickness direction of the plate portion of the second portion of the frame member 2 is cut, and the welding margin 21 is made difficult to protrude to the outer peripheral side with respect to the position of the original end surface of the frame member 2. In the removing process, the thickness-increased portion 17 is removed, so that the appearance of the resin frame can be improved. In the welding process, the entire end surfaces are welded as the welding margin 21 in the first portion, and protrude toward the outer peripheral side with respect to the position of the original end surface of the frame member 2, so that the joining strength can be improved.

The present invention is not limited to the above-described embodiment, and modifications can be made without departing from the scope thereof.

Although in the present embodiment the partition member is an object that is attached in a manner capable of being opened and closed, for example a sash, but the present invention is not limited thereto, and the partition member may be a plate fixed to the resin frame 1, that is, fixed glass.

In the present embodiment, the frame member 2 includes the recessed portion 6, but the present invention is not limited thereto, and the recessed portion 6 may not be included. In the present embodiment, the frame member 2 includes three recessed portions 6, but the present invention is not limited thereto, and two or four or more recessed portions 6 may be included.

In the present embodiment, the thickness-increased portion 17 is provided only in the outer protruding portion 8 of the frame member 2, but the present invention is not limited thereto, and the thickness-increased portion 17 may be provided in other portions.

In the present embodiment, the resin frame 1, which is rectangular when viewed from the front-rear direction, is configured by four frame members 2, but the present invention is not limited thereto, the number of the frame members 2 may be five or more if an outer shape of the resin frame 1 is rectangular when viewed in the front-rear direction.

In one example of the resin frame in a case where the number of frame members is five, one frame member is used in each portion corresponding to an upper side, a lower side, a right side and a left side of the rectangle, and a bridging frame member is used to bridge the frame member corresponding to the upper side of the rectangle (the upper frame member) and the frame member corresponding to the lower side (the lower frame member). The bridging frame member is parallel to the up-down direction, and is generally referred to as a mullion.

In one example of the resin frame in a case where the number of frame members is seven, one frame member is used in each portion corresponding to the left side and the right side of the rectangle (the left frame member and the right frame member). A frame member parallel to the up-down direction (a mullion frame member) is used between the left frame member and the right frame member. Frame members are used separately on left and right sides centered on the mullion frame member in portions corresponding to the upper side of the rectangle (an upper left frame member and an upper right frame member), while frame members are used separately on the left and right sides centered on the mullion frame member in portions corresponding to the lower side of the rectangle (a lower left frame member and a lower right frame member). That is, an upper end portion of the mullion frame member is sandwiched by the upper left frame member and the upper right frame member, and a lower end portion of the mullion frame member is sandwiched by the lower left frame member and the lower right frame member to form the upper side and the lower side of the rectangle.

In the present embodiment, the plurality of frame members 2 constituting the resin frame 1 have the same shape, and the end surfaces of the pair of frame members adjacent to each other in the corner portion of the rectangle are abutted against each other, but the present invention is not limited thereto, and the end surfaces may have different shapes. In this case, in the pair of frame members adjacent to each other in the corner portion of the rectangle, portions of end surfaces which are abutted against each other may have the same shape.

Figure 10A:
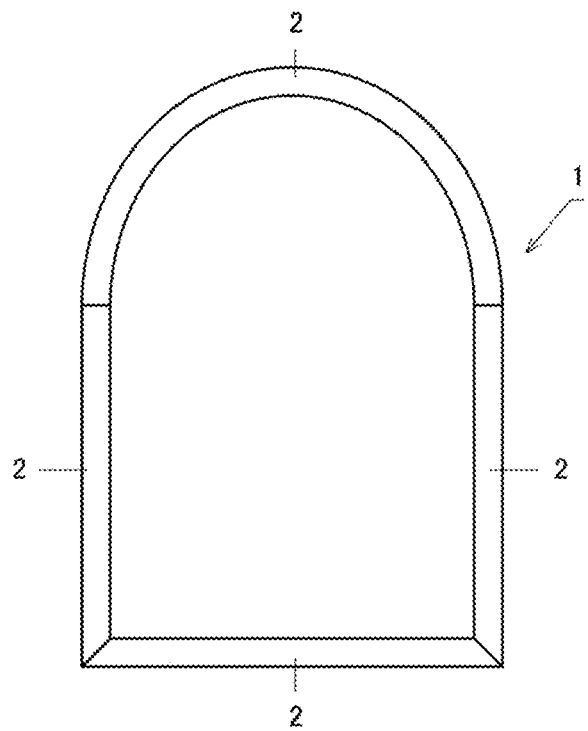
FIGS. 10A and 10B are front views showing an example of a resin frame of the present invention.

The outer shape of the resin frame 1 is rectangular in the present embodiment, but the present invention is not limited thereto, and the resin frame 1 may have a triangular shape or have a polygonal shape including five or more corners, or have a frame shape including at least one corner portion. In an example in which the outer shape of the resin frame 1 is a frame shape including two corner portions, shapes of upper, lower, left and right sides of the frame shape are as shown in FIG. 10A. A shape of the upper side is a semicircular shape that bulges upward. Shapes of the left side and the right side are straight line shapes parallel to each other. The lower side has a straight line shape orthogonal to the right side and the left side. In this case, corner portions are formed on left and right sides of the lower side. Accordingly, the outer shape of the resin frame 1 in the example of FIG. 10A includes two corner portions. In this case, the number of frame members 2 that form the resin frame 1 corresponds to each of the upper, lower, left, and right sides, that is, four.

Figure 10B:
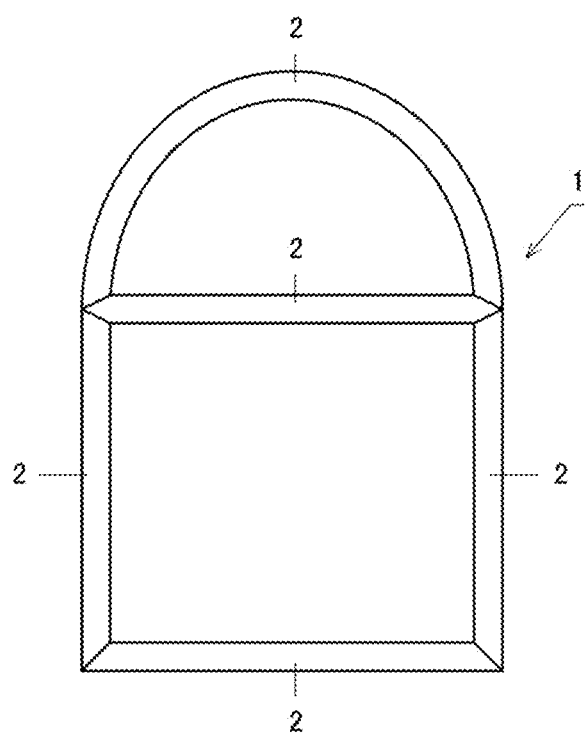

In another example in which the outer shape of the resin frame 1 is a frame shape including two corner portions, the number of the frame members 2 is five as shown in FIG. 10B. The resin frame 1 in this case includes, in addition to the frame members 2 corresponding to the upper, lower, left and right sides which are the same as in FIG. 10A, an extra frame member 2 is provided to bridge an upper end of the frame member 2 corresponding to the left side and an upper end of the frame member 2 corresponding to the right side. A left end portion of the bridging frame member 2 is sandwiched between a left end portion of the frame member 2 corresponding to the upper side and an upper end portion of the frame member 2 corresponding to the left side, and a right end portion of the bridging frame member 2 is sandwiched between a right end portion of the frame member 2 corresponding to the upper side and an upper end portion of the frame member 2 corresponding to the right side.

In the present invention, the term "forming a resin frame by combining a frame shape that includes a corner portion when viewed from the front-rear direction" means that the resin frame is formed in a manner that the outer shape of the resin frame viewed from the front-rear direction is a frame shape including a corner portion. In the present invention, the term "a pair of frame members adjacent to each other in a corner portion" is limited to a case where the number of frame members present at the corner portion is two. In other words, the "pair of frame members adjacent to each other in the corner portion" is, for example, two frame members extending along two adjacent sides of a polygon if the outer shape of the resin frame is polygonal. The two frame members include a joint portion where end surfaces of the two frame members are abutted against each other and joined.

Meanwhile, when the number of frame members present in the corner portion is three, the frame members does not coincide with the pair of frame members adjacent to each other in the corner portion in the present invention. For example, a case where the number of frame members present in the corner portion is three includes: two frame members extending in a direction away from the vicinity of a corner portion of a polygon, and extending along two adjacent sides from the vicinity of the corner; and one frame member extending from the corner portion in a manner that partitions the two adjacent sides.

In view of the above, embodiments according to the present application are briefly explained as below.

In the resin frame, a frame member is combined into a frame shape that includes a corner portion, and a partition member is provided inside the frame shape to partition front and rear portions. The frame member includes a plate portion. A joint portion is provided to join a pair of frame members which are adjacent to each other at the corner portion through abutting end surfaces of the pair of the frame members. The joint portion includes: an entire-surface welded portion, in which the end surfaces of the pair of frame members are welded to each other over an entire surface in a thickness direction of the plate portion; and a partial welded portion, in which the end surfaces of the pair of frame members are welded to each other on one side of the entire surface in the thickness direction of the plate portion while another side of the entire surface in the thickness direction is not welded. The entire-surface welded portion and the partial welded portion are present at different portions on an outer periphery of the joint portion.

Figure 6A:
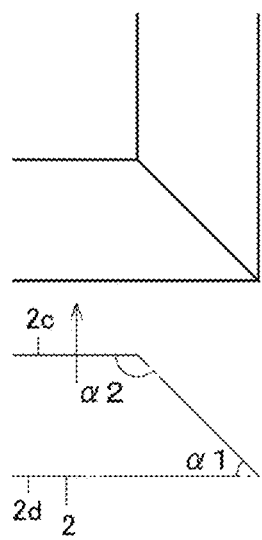
FIGS. 6A and 6B are explanatory diagrams showing a state at a moment when a pair of frame members viewed from a front-rear direction is abutted against each other and a state after the pair of frame members are abutted against each other and welded.

In other words, the frame shape is an annular shape. Including the corner portion means that at least one corner portion is included. Examples of the frame shape including the corner portion include a polygonal shape. The polygonal shape is a triangle or a shape having more corners, preferably a quadrangle, and more preferably a rectangle. In the following description, a rectangular resin frame will be described as an example of the polygonal resin frame. The resin frame is rectangular when viewed in a front-rear direction. Joint portions are formed at corner portions located at four corners of the rectangle. When a joint portion is formed, a pair of predetermined frame members 2 which are adjacent to each other as shown in FIG. 6A is normally held parallel to two adjacent sides of four sides of the rectangle, and a force is applied to move the frame members toward an inner side of the rectangle. End surfaces of the pair of frame members 2 are abutted against each other and welded so as to be orthogonal to each other when viewed in the front-rear direction. Here, it is assumed that the frame member 2 has a rectangular bar shape regardless of an actual shape of the frame member, and the end surface thereof is inclined when viewed in the front-rear direction. When welding is performed, an end portion including the end surface of the frame member (welding margin) is sufficiently melted.

Figure 6B:
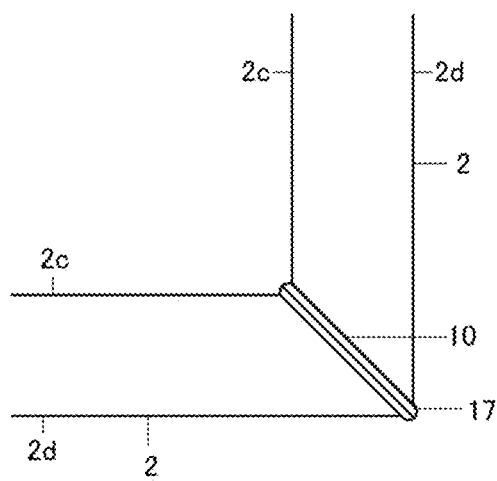

Melted resin is joined by the force that moves the frame member 2 as shown in FIG. 6B. When the joining is performed, a portion of the melted resin (welding margin) protrudes on an outer peripheral side with respect to a position of the original end surface of the frame member, and another portion of the melted resin moves in a manner of being pushed out to an outer side of the resin frame when viewed in the front-rear direction, thereby forming the joint portion 10.

When the joint portion is formed, due to influence of the melted resin pushed out to the outer side of the resin frame (hereinafter, referred to as "influence of melted resin"), outer surface portions of the end portions of the pair of frame members are opened (separated apart).

The protruding portion, in other words, a portion whose thickness is increased (thickness-increased portion 17) can be removed by cutting, and the appearance of the resin frame is improved if the thickness-increased portion is removed. Regardless of presence or absence of the removal, the end surfaces of the pair of adjacent frame members 2 are entirely joined to each other, so that the joining strength is sufficiently ensured.

With respect to rigidity of the frame member 2, an outer surface portion 2d of the end portion of the frame member 2 is weaker than an inner surface portion 2c of the end portion of the frame member 2. A reason therefor is that an angle (interior angle) of the end portion of the frame member 2 on a side of the outer surface portion 2d is an acute angle α1, whereas an angle (interior angle) of the end portion of the frame member 2 on a side of the inner surface portion 2c is an obtuse angle α2 when viewed in the front-rear direction.

As a result, when the rigidity of the outer surface portion 2d of the end portions of the pair of adjacent frame members 2 becomes weaker, the pair of frame members 2 is easier to be separated (become an opened shape) during the joining, and the joining strength becomes weaker.

Figure 7A:
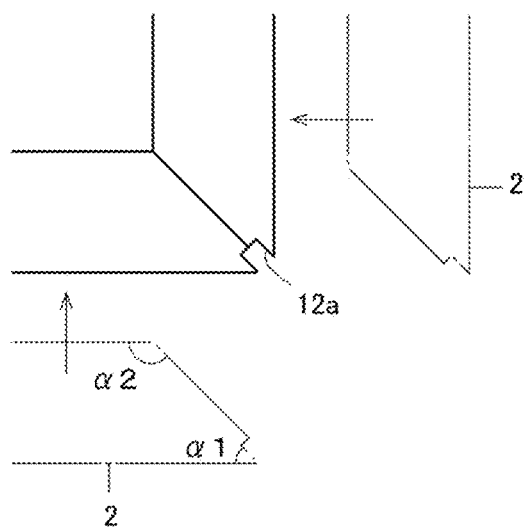
FIGS. 7A and 7B are explanatory diagrams showing a state at a moment when a pair of frame members viewed from the front-rear direction is abutted against each other and a state after the pair of frame members are abutted against each other and welded.

For example, a structure, in which the outer surface portion 2d on the end surface of the frame member 2 is cut in a manner shown in FIG. 7A when viewed from the front-rear direction, is conceived. The invention is not limited to the structure shown in FIG. 7A, the pair of frame members 2 can also be welded when only a portion of the end surfaces is cut, and then the joint portion 10 becomes a partial welded portion 12. In this structure, the outer surface portion 2d of the end surface of the pair of frame members 2 becomes an unwelded portion 12a of the joint portion 10, and rigidity thereof is weaker than rigidity of a structure in which no cutting is performed.

Figure 7B:
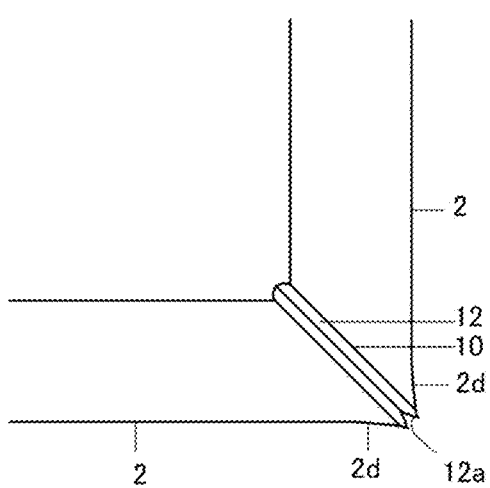

When the end surfaces of the pair of frame members 2 are abutted against each other during the joining of the pair of frame members 2 as shown in FIG. 7B, the outer surface portions 2d having weak rigidity are separated from each other due to the influence of the melted resin, and the joining strength is weakened.

Meanwhile, a structure, in which the inner surface portion 2c on the end surface of the frame member 2 is cut in a manner shown in FIG. 8A when viewed from the front-rear direction, is conceived. In this structure, when the pair of frame members 2 is welded, the inner surface portions 2c of the end surfaces of the pair of frame members 2 become the unwelded portion 12a.

The inner surface portion 2c of the end portion of the frame member 2 has the obtuse angle α2 when viewed in the front-rear direction, and has stronger rigidity than a right angle structure. In such a case, when the end surfaces of the pair of frame members 2 are abutted against each other during the joining of the pair of frame members, the inner surface portions 2c of the pair of adjacent frame members 2 are hardly affected by the melted resin. The inner surface portions 2c of the pair of adjacent frame members 2 simply come close to each other, and a slight gap is generated between the inner surface portions 2c, thereby providing good appearance. With respect to the joint portion 10, the inner surface portion 2c among four surfaces of the pair of adjacent frame members 2 is difficult to be cut as compared with other three surface portions.

Figure 9A:
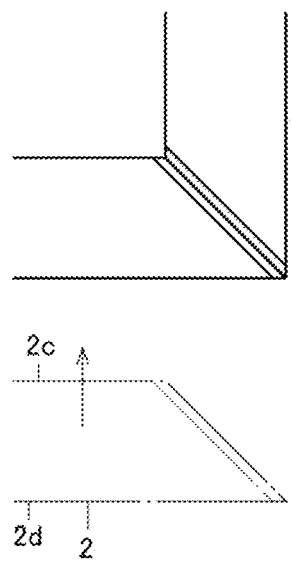
FIGS. 9A to 9C are explanatory diagrams showing a state at a moment when a pair of frame members viewed from the front-rear direction are abutted against each other, a state after the pair of frame members are abutted against each other and welded, and a cross-sectional view taken along a line A-A after the welding.
Figure 9B:
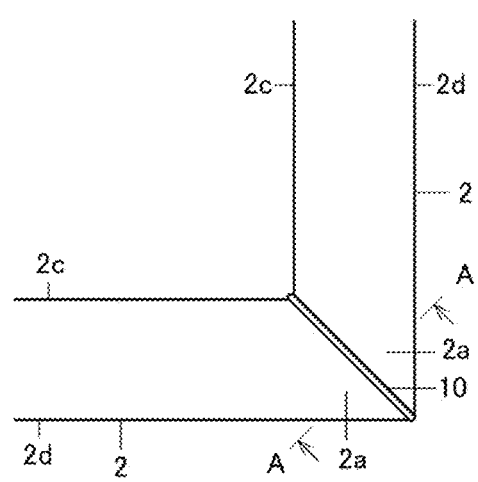
Figure 9C:
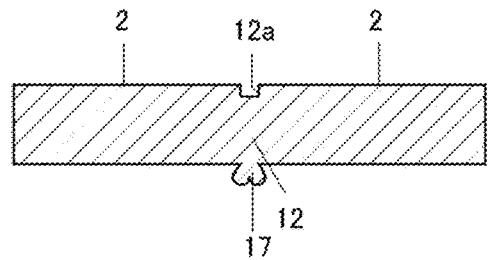

A structure, in which a front surface portion 2b on the end surface of the frame member 2 is cut in a manner shown in FIG. 9A when viewed from a front side, is conceived. In this structure, when the pair of frame members 2 is welded, the front surface portions 2b of the end surfaces of the pair of frame members 2 become the unwelded portion 12a.

In such a case, when the end surfaces of the pair of frame members 2 are abutted against each other, the front surface portions 2b of the pair of adjacent frame members 2 are hardly affected by the melted resin. The front surface portions 2b of the pair of adjacent frame members 2 simply come close to each other, and a slight gap is generated between the front surface portions 2b, thereby providing good appearance.

In order to improve the joining strength and the appearance of the joint portion of the resin frame, it is preferable to provide a second aspect of the present invention.

In the second aspect of the present invention, a joint portion includes a partial welded portion in an inner surface portion of a pair of adjacent frame members. An entire-surface welded portion is provided on at least one of three surface portions of the pair of adjacent frame members other than the inner surface portion, the three surface portions including a front surface portion, a rear surface portion and an outer surface portion. The partial welded portion on the inner surface portion of the pair of adjacent frame members includes an unwelded portion on an inner surface side of the partial welded portion.

A surface of the joint portion of the resin frame may be cut or may not be cut. The cutting is easier to be performed on a convex surface or a flat surface than on an inner surface of a recessed portion. In order to improve appearance when a frame member includes the recessed portion, it is preferable to provide a third aspect of the present invention.

The third aspect of the present invention is premised on the second aspect of the present invention. The frame member includes a hollow portion which serves as a main body, and a plurality of inner protruding portions, provided at intervals in the front-rear direction, which protrude from an inner surface among surfaces of the hollow portion. A recessed portion opened toward an inner inside of the resin frame is formed by a pair of inner protruding portions adjacent in the front-rear direction and the hollow portion. The partial welded portion is provided in the recessed portion in the joint portion.

A step portion may be provided on an outer surface portion of the hollow portion. However, in a case where the section portion is provided, since the section portion of the outer surface portion of the hollow portion is affected by the melted resin during the joining of the pair of adjacent frame members, the joining strength is weak in the section portion of the outer surface portion of the hollow portion. Therefore, in order to improve the joining strength in the section portion, it is preferable to provide a fourth aspect of the present invention.

The fourth aspect of the present invention is premised on the second or third aspect. The hollow portion includes: a first step portion disposed on at least one side, including a rear side and a front side, of the outer surface portion of the hollow portion; a second step portion disposed closer, than the first step portion, to an intermediate portion side in the front-rear direction, the second step portion being disposed at an outer side of the resin frame than the first step portion; and a stepped portion that connects the first step portion and the second step portion in a stepped shape. The entire-surface welded portion is provided on the first step portion and the second step portion in the joint portion.

The protruding portion (thickness-increased portion) formed during the joining is not necessarily removed. However, in order to improve the appearance, it is preferable that as many as possible of the surfaces of the pair of adjacent frame members in the joint portion and the vicinity thereof are formed along a peripheral direction of the resin frame. However, it is also assumed that a boundary position between the entire-surface welded portion and the partial welded portion may be present in a region that is difficult to be removed out of the frame members. In such a case, it is preferable that the thickness-increased portion is located at the boundary position, and the appearance of other portions is optimized, which is considered as an example of a fifth aspect of the present invention.

The fifth aspect of the present invention is premised on any one of the first to fourth aspects of the present invention. The pair of adjacent frame members includes: a planar surface portion formed along the peripheral direction of the resin frame; a bent surface portion that bends along the peripheral direction of the resin frame; and a thickness-increased portion with respect to the planar surface portion or the bent surface portion in the joint portion. The thickness-increased portion is located at a boundary position between the entire-surface welded portion and the partial welded portion.

A fitting according to the present invention includes a resin frame and a partition member held by the resin frame.

In a resin frame manufacturing method according to the present invention, end surfaces of a plurality of resin members provided with plate portions are abutted against each other, welded and combined into a frame shape having a corner portion. The method includes: a cutting process, in which end portions of the frame members are recessed in a stepped shape; a melting process, in which the end surfaces of the frame members are heated and melted; a welding process, in which the end surfaces of a pair of frame members are abutted against each other and welded; and a removing process, in which a portion of a welding margin that protrudes in the welding process is removed.

The cutting process is a process in which a pair of frame members among the plurality of the frame members, which are adjacent to each other at the corner portion, is recessed in a stepped shape by cutting another side with respect to one side of a second portion in a thickness direction of a plate portion. The second portion is different from a first portion located in an outer periphery of the end surfaces of the pair of the frame members.

The melting process is a process in which the end surfaces of the pair of frame members are heated, the entire end surfaces are melted as a welding margin in the first portion, and one side of the end surfaces is melted as a welding margin in the second portion.

The welding process is a step in which the welding margins on the end surfaces of the pair of frame members are abutted against each other and welded. A portion of the welding margin protrudes on an outer peripheral side with respect to a position of the original end surfaces of the frame members in the first portion.

According to the resin frame of the present invention, since the joint portion includes the entire-surface welded portion and the partial welded portion, the joint strength and the appearance can be harmonized at a level corresponding to a ratio of the entire-surface welded portion and the partial welded portion.

According to the second aspect of the present invention, since the partial welded portion located in the inner surface portion (a portion which is difficult to be cut) of the pair of frame members adjacent to each other at the corner portion includes the unwelded portion on an inner surface side, the appearance of the inner surface side of the resin frame can be improved. Since the entire-surface welded portion is provided on at least one surface portion of the three surface portions, including the front surface portion, the rear surface portion, and the outer surface portion, of the pair of adjacent frame members, the joining strength can be improved.

According to the third aspect of the present invention, since the partial welded portion is provided in the recessed portion (a portion which is difficult to be cut) that opens toward the inner side of the resin frame, the appearance of the recessed portion of the resin frame can be improved.

According to the fourth aspect of the present invention, the first step portion, the second step portion, and the stepped portion are provided on the outer surface portion of the hollow portion. Since the first step portion and the second step portion are provided with the entire-surface welded portion, the joining strength of these step portions can be improved.

According to the fifth aspect of the present invention, since the planar surface portion and the bent surface portion are provided as surfaces along the resin frame in addition to the thickness-increased portion, the appearance can be improved.

According to the fitting of the present invention, the joining strength and the appearance of the resin frame can be harmonized.

According to the resin frame manufacturing method of the present invention, in the cutting process, the other side in the thickness direction of the plate portion of the second portion of the frame member is cut, and the welding margin is made difficult to protrude to the outer peripheral side with respect to the position of the original end surface of the frame member. In the removing process, a portion of the protruding welding margin is removed, so that the appearance of the resin frame can be improved. In the welding process, the entire end surfaces are welded as the welding margin in the first portion, so that the joining strength can be improved.

What is claimed is:

1. A resin frame comprising:
   frame members combined into a frame shape that includes a corner portion; and
   a joint portion joining a pair of the frame members which are adjacent to each other at the corner portion, wherein each of the frame members is configured to be provided with a partition member inside the frame shape to partition front and rear portions,
   the frame member includes a plate portion, end surfaces of the pair of the frame members are abutted at the joint portion to be jointed to each other, the joint portion includes:

an entire-surface welded portion, in which the end surfaces of the pair of the frame members are welded to each other over an entire surface in a thickness direction of the plate portion; and a partial welded portion, in which the end surfaces of the pair of the frame members are welded to each other on one side of the entire surface in the thickness direction of the plate portion while another side of the entire surface in the thickness direction is not welded, and the entire-surface welded portion and the partial welded portion are present at different portions on an outer periphery of the joint portion.

2. The resin frame according to claim 1, wherein the partial welded portion is provided on an inner surface portion of the pair of the adjacent frame members in the joint portion, the entire-surface welded portion is provided on at least one of three surface portions of the pair of the adjacent frame members other than the inner surface portion, the three surface portions including a front surface portion, a rear surface portion and an outer surface portion, and the partial welded portion on the inner surface portion of the pair of the adjacent frame members includes an unwelded portion on an inner surface side of the partial welded portion.

3. The resin frame according to claim 2, wherein the frame member includes a hollow portion which serves as a main body, and a plurality of inner protruding portions, provided at intervals in a front-rear direction, which protrude from an inner surface among surfaces of the hollow portion, a recessed portion opened toward an inner inside of the resin frame is formed by a pair of the inner protruding portions adjacent in the front-rear direction and the hollow portion, and the partial welded portion is provided in the recessed portion in the joint portion.

4. The resin frame according to claim 3, wherein the hollow portion includes:

a first step portion disposed on at least one side, including a rear side and a front side, of an outer surface portion of the hollow portion;

a second step portion disposed closer, than the first step portion, to an intermediate portion side in the front-rear direction, the second step portion being disposed at an outer side of the resin frame than the first step portion; and a stepped portion that connects the first step portion and the second step portion in a stepped shape, and the entire-surface welded portion is provided on the first step portion and the second step portion in the joint portion.

5. The resin frame according to claim 1, wherein the pair of the adjacent frame members includes:

a planar surface portion formed along a peripheral direction of the resin frame;

a bent surface portion that bends along the peripheral direction of the resin frame; and a thickness-increased portion with respect to the planar surface portion or the bent surface portion in the joint portion, and the thickness-increased portion is located at a boundary position between the entire-surface welded portion and the partial welded portion.

6. A fitting, comprising:

the resin frame according to claim 1; and the partition member held by the resin frame.

* * * * *